(12) United States Patent
Kashi et al.

(10) Patent No.: US 9,154,531 B2
(45) Date of Patent: Oct. 6, 2015

(54) SYSTEMS AND METHODS FOR ENHANCED CONFERENCE SESSION INTERACTION

(71) Applicant: Avaya Inc., Basking Ridge, NJ (US)

(72) Inventors: Ramanujan Kashi, Bangalore (IN); Honey Malhotra, Bangalore (IN)

(73) Assignee: Avaya Inc., Basking Ridge, NJ (US)

( * ) Notice: Subject to any disclaimer, the term of this patent is extended or adjusted under 35 U.S.C. 154(b) by 193 days.

(21) Appl. No.: 13/920,369

(22) Filed: Jun. 18, 2013

(65) Prior Publication Data

US 2014/0372908 A1  Dec. 18, 2014

(51) Int. Cl.
*H04L 29/06* (2006.01)

(52) U.S. Cl.
CPC .................. *H04L 65/403* (2013.01)

(58) Field of Classification Search
CPC .................................. H04L 12/1831
USPC ....................................... 715/753
See application file for complete search history.

(56) References Cited

U.S. PATENT DOCUMENTS

| | | | |
|---|---|---|---|
| 2004/0255232 A1* | 12/2004 | Hammond et al. | 715/500 |
| 2006/0020665 A1* | 1/2006 | Hagale et al. | 709/204 |
| 2009/0327896 A1* | 12/2009 | Pall et al. | 715/730 |
| 2011/0283008 A1* | 11/2011 | Smelyansky | 709/231 |
| 2012/0023407 A1* | 1/2012 | Taylor | 715/731 |
| 2012/0226984 A1* | 9/2012 | Bastide et al. | 715/730 |
| 2012/0278738 A1* | 11/2012 | Kruse et al. | 715/754 |
| 2013/0227434 A1* | 8/2013 | Jones et al. | 715/753 |
| 2014/0006491 A1* | 1/2014 | Hammer et al. | 709/204 |

* cited by examiner

*Primary Examiner* — Omar Abdul-Ali

(57) ABSTRACT

Disclosed herein are systems, methods, and non-transitory computer-readable storage media for enhancing presenter and participant interaction in a presentation. A system configured to practice the method can receive, from a viewer of an electronic presentation, a submission of a question and a selection of a communication mode for the question. The system can identify a portion of the presentation to which the question is directed, and update the portion of the electronic presentation to incorporate the question based on the communication mode. The electronic presentation can be a slide show, such as a PowerPoint™ presentation. The system can optionally notify a presenter in the electronic presentation that the portion has been updated.

20 Claims, 8 Drawing Sheets

SYSTEMS AND METHODS FOR ENHANCED CONFERENCE SESSION INTERACTION

BACKGROUND

1. Technical Field

The present disclosure relates to presentations and more specifically to enhancing presenter and participant interactions in presentations.

2. Introduction

In a typical CEO type audio broadcast, participants are all generally muted to avoid distractions and background noise and to allow the presenter to speak uninterrupted. Participants listening in on phones, computers, or other device, need to wait until the end of the presentation to be able to ask questions rather than asking them at the point of confusion or interest. This delay may cause participants to forget their questions, or may lead to additional confusion as foundational principles, upon which later points are based, go misunderstood. However, in commercially available web conferencing apps participants may be allowed to type their questions using a text chat. There is no mechanism available to have participants link their questions to specific charts or portions of the broadcast. Further, there is no notification mechanism to the presenter that there may be a lot of questions on a specific part of the presentation, which could be more efficiently addressed during the initial discussion of that specific part rather than later on in the presentation or after the main presentation. Existing conferencing solutions also do not provide an interactive way to maintain a question and answer session for offline conference recordings.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This framework enables participants of audio or web conferences to submit their questions at the appropriate time without disturbing the ongoing conference. Participants in audio conferences can trigger a question submission by pressing some DTMF digits or a keyboard combination on a computer or clicking a button to enable the audio conferencing system to record the question. Participants on web conferencing can click on a certain slide to ask the relevant questions, either through chat, or record both audio and video. The system receives the question and can link the question to a certain slide of the presentation or to a particular portion of a slide, such as a chart, bullet point, or image. The participant device can handle receiving the question, and submit it to a presentation server so the course of the conference is not disturbed. The system can then highlight these chat, audio, or video questions in a non-intrusive manner to the speaker to address this at the opportune time. This approach also operates on recorded conferences as well as live conferences, where the recordings are updated to enable participants asking questions and their corresponding responses by the presenter. Thus, as additional answers and questions are contributed to a recorded conference, the conference becomes a living, growing conference that can be updated dynamically to take in to account new questions and new or updated answers and annotations. Users can subscribe to the recorded conference to receive notifications of the changes so that users do not need to view the entire recordings over and over again.

This approach allows participants to ask questions at the time of confusion or interest. Participants can use a chat, audio or video in web conferencing to interact in a broadcast type sessions. The system can, according to information provided by the presenter, auto-answer questions based on presenter notes or attached documents associated with the conference.

Disclosed herein are systems, methods, and non-transitory computer-readable storage media for enhancing presenter and participant interaction in a presentation. The electronic presentation can be a slide show, such as a PowerPoint™ presentation. A system configured to practice the method can receive, from a viewer of an electronic presentation, a submission of a question and a selection of a communication mode for the question. The communication mode can be at least one of a text-based chat, audio, or video, or some other remote presence application. The system can identify a portion of the presentation to which the question is directed, and update the portion of the electronic presentation to incorporate the question based on the communication mode. The system can update the portion of the electronic presentation by incorporating the question into at least one of a viewer interface for the electronic presentation or a presenter interface for the electronic presentation. The system can optionally notify a presenter in the electronic presentation that the portion has been updated. The presenter can provide a response to the question, which the system can insert in the portion of the electronic presentation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The presentation system disclosed herein provides a way for participants to patch an audio, video or a note to a live or recorded conference, with the reference to slide number or page number or to some other specific content in the conference or presentation. The system can notify the presenter in real time as the presentation is on-going or offline for a previously recorded presentation. The system can notify the presenter of the details like "Participant X asked a question on slide 2." The presenter can also patch the audio or a note to the conference recording while replying back to questions. The presentation system can also provide automatic replies based on moderator notes, previously asked questions and corresponding answers of the same or a similar or related presentation, and additional document attached in conference. Using attached documents and presenter notes, the system can match keywords asked in questions and update the presentation automatically with corresponding answers or resources. The questions asked can be answered automatically just for the asker, or can be provided to all of the other participants or a subset thereof. The subset can be selected based on one or more of the content of the question, content of the answer, the participant asking the question, or the presenter. The system can also notify the presenter of automatic replies so he can change or modify the reply if necessary. In a normal audio or video conference, participants can use DTMF keys to patch their audio or video questions at any time in a conference. The server can store this patch with a timestamp indicating when question was asked, and send notification to the presenter. The flow charts in FIGS. 1-3 describe the participant and presenter or moderator work flows.

Figure 1:
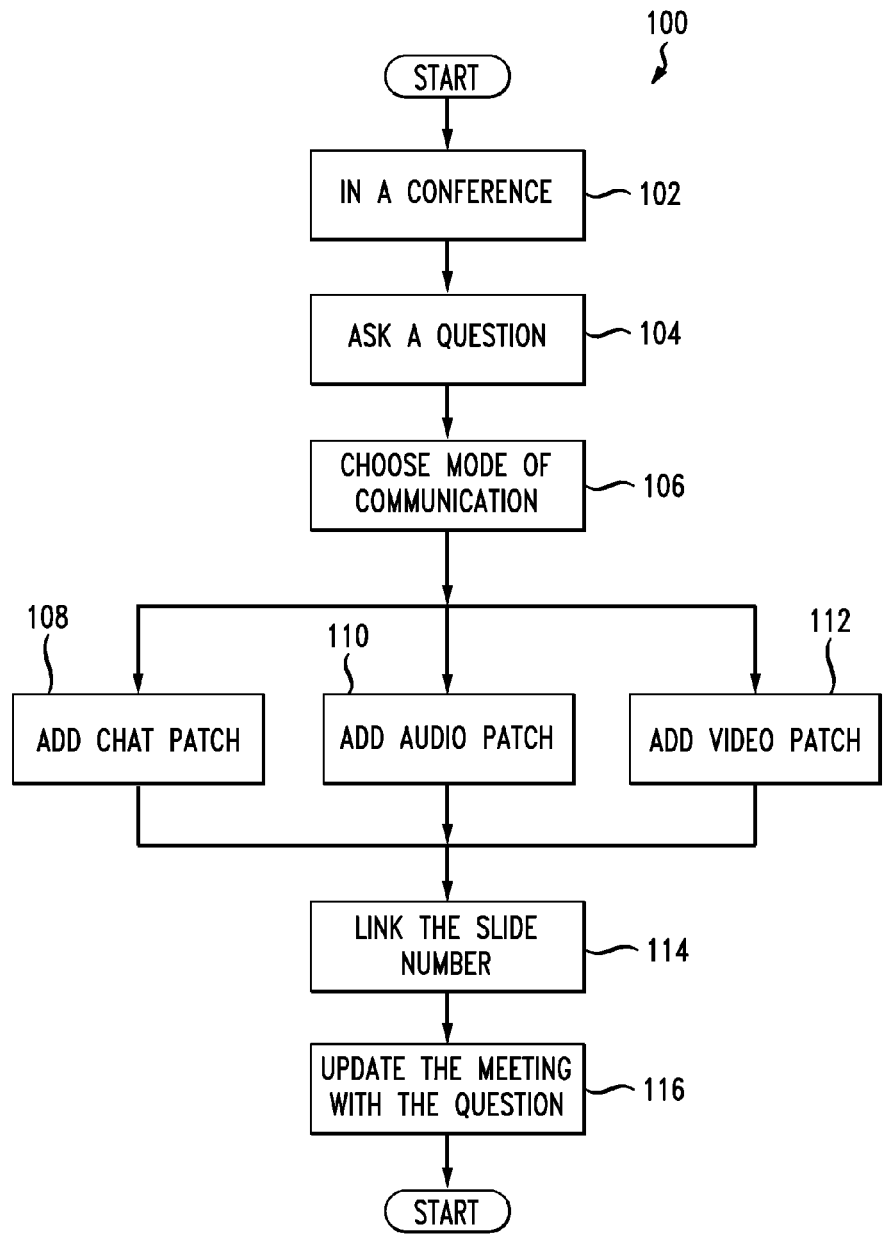
FIG. 1 illustrates an example flow chart for a participant.

FIG. 1 illustrates an example flow chart 100 for a participant. The participant is typically a person listening, on a muted line, to a main presenter or presenters. The participant can also participate in a web conference in a similar manner. The participant is usually one of multiple participants receiving the presentation from the presenter. In an ongoing conference 102, the participant can ask a question 104 anytime using any selected communication medium 106, such as audio 110, video 112, or text based chat 108. Before or after the question 104 or as part of the submitted question, the participant can indicate a portion of the presentation, such as a slide number 114, to which the question relates. The system processes the information received from the participant, and can update the conference with the question 116. The system can update the conference for just the presenter until the presenter provides an answer, at which time the system can update the conference with the question and corresponding answer for multiple participants. Alternatively, the system can update the conference with the question for other participants to see before the presenter answers the question. Other participants who may not be presenting, but who may be designated as able to provide answers may also answer the question for the presenter.

Figure 2:
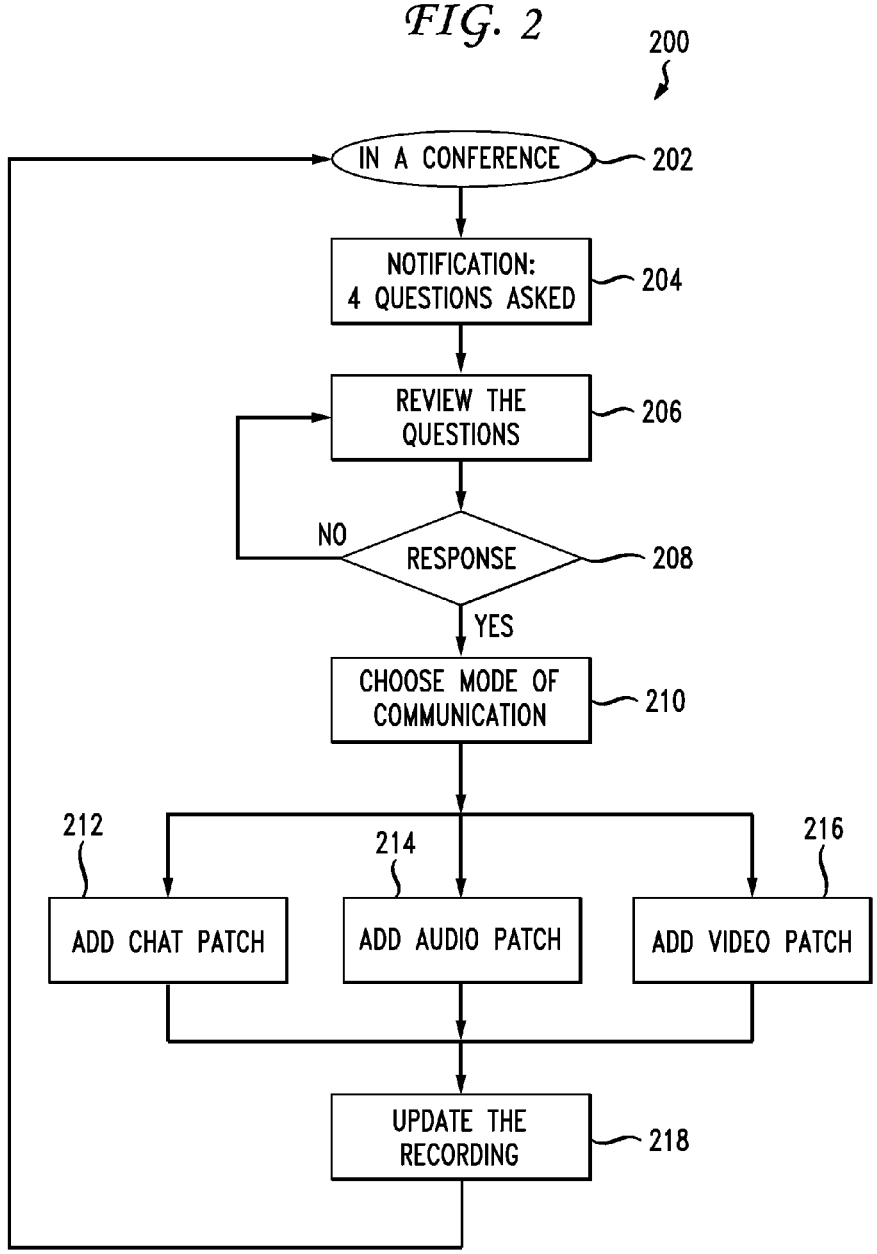
FIG. 2 illustrates an example flow chart for a moderator.

FIG. 2 illustrates an example flow chart 200 for a presenter or moderator. In a conference 202, the presenter receives a notification 204 of questions asked by participants, such as "4 questions asked" with a short summary of each. The short summary may include key words, a text transcript, an indication or image of the participant asking the question, and so forth. Upon receiving the question, the system can review the question 206 and attempt to find a response 208 based on attached documents and notes provided by the presenter, as shown in the auto reply panel 512 of FIG. 5. If the system finds relevant keywords, the system can suggest the corresponding answer to the presenter and provide the option to update the answer. Alternatively, if the corresponding answer exceeds a certainty threshold, the system can automatically answer on behalf of the presenter. If a keyword search fails, then the system can allow the presenter to answer the question manually using any communication medium or directly in-line in the presentation. The presenter can choose a mode of communication 210 for the answer, and the system can automatically select a chat patch 212, audio patch 214, or video patch 216 based on the mode of communication. Once the presenter answer patch is ready, the system can update a recording 218 of the conference, and send a notification to the corresponding participant(s) who asked the question or a related question or who flagged the question for follow up. The presenter can broadcast any specific question and answer pair to all participants, for example when the presenter considers the question to be of broad relevance to the entire group of participants.

Figure 3:
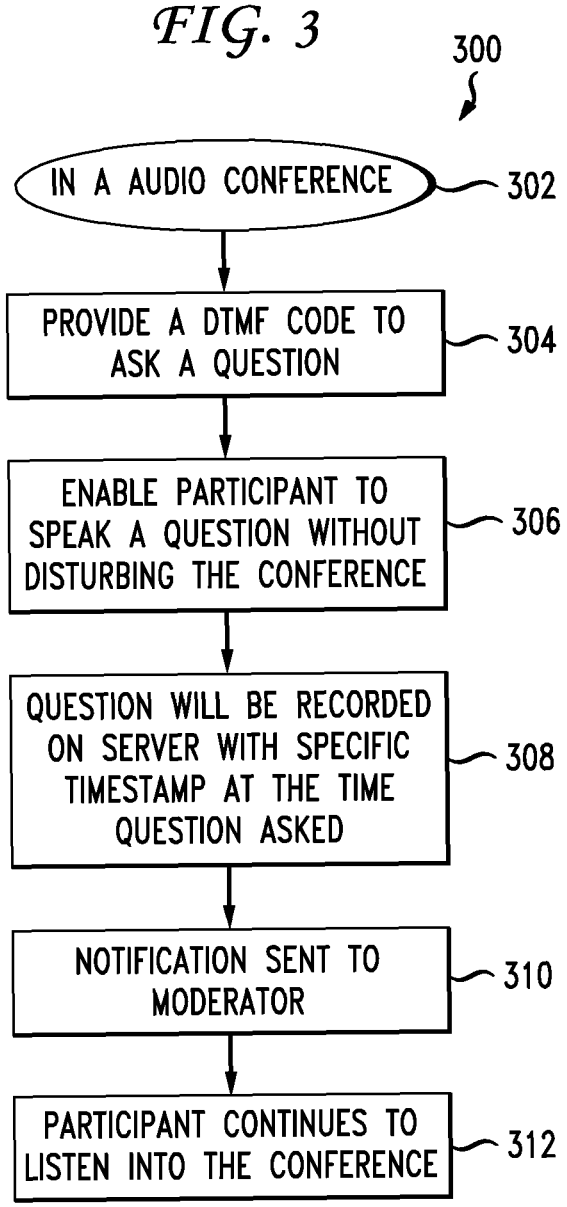
FIG. 3 illustrates an example flow chart for a participant in a normal audio conference.

FIG. 3 illustrates an example flow chart 300 for a participant in an audio broadcast conference 302. This approach can enhance the functionality of existing conferencing mechanisms to enable participants to ask questions at the point of confusion. A participant presses a DTMF code to ask a question 304, and the system prompts the participant to ask the question at that time without disturbing the existing ongoing audio conference 306. The system can tag this question to the timeline of when it was asked during the broadcast 308 with a specific timestamp. Then the system can send a notification 310 to the presenter or moderator that a question has been asked. The participant can continue to listen to the conference 312. In this way, all participants can record and submit their respective questions at the point of confusion and associate the question with a specific portion of the conference or presentation materials.

Figure 4:
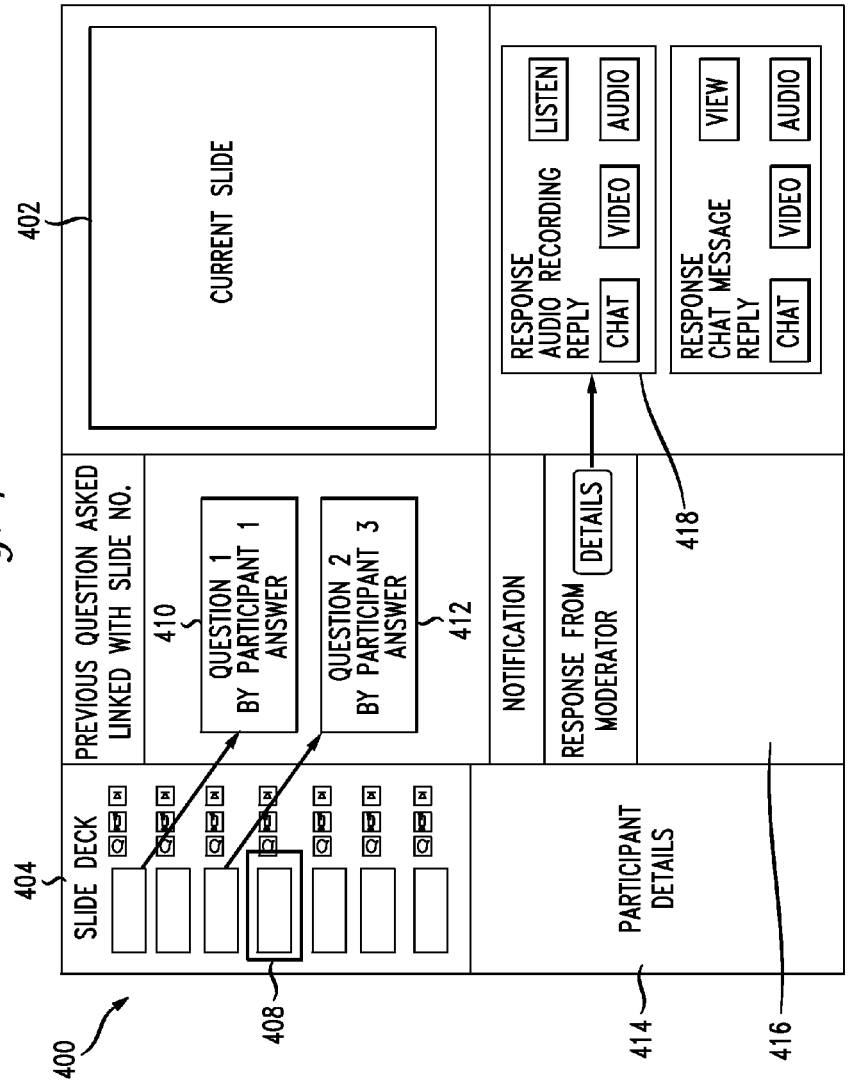
FIG. 4 illustrates an example participant user interface.

FIG. 4 illustrates an example participant user interface 400. The interface 400 includes the current slide 402 for a slide-based presentation, but can include a video feed or no visual component at all in the case of an audio-only presentation. The interface 400 can also include a browsable slide deck 404 for a slide-based presentation. The interface 400 can indicate a currently active slide 408 in the slide deck 404. The interface 400 can include, with each slide, buttons to submit audio, video, or chat questions. The system can receive the questions and link each question 410, 412 with a corresponding slide, topic, or other portion of the presentation. A participant can also read and edit previously asked questions 418 and review responses from the presenter during the conference.

Figure 5:
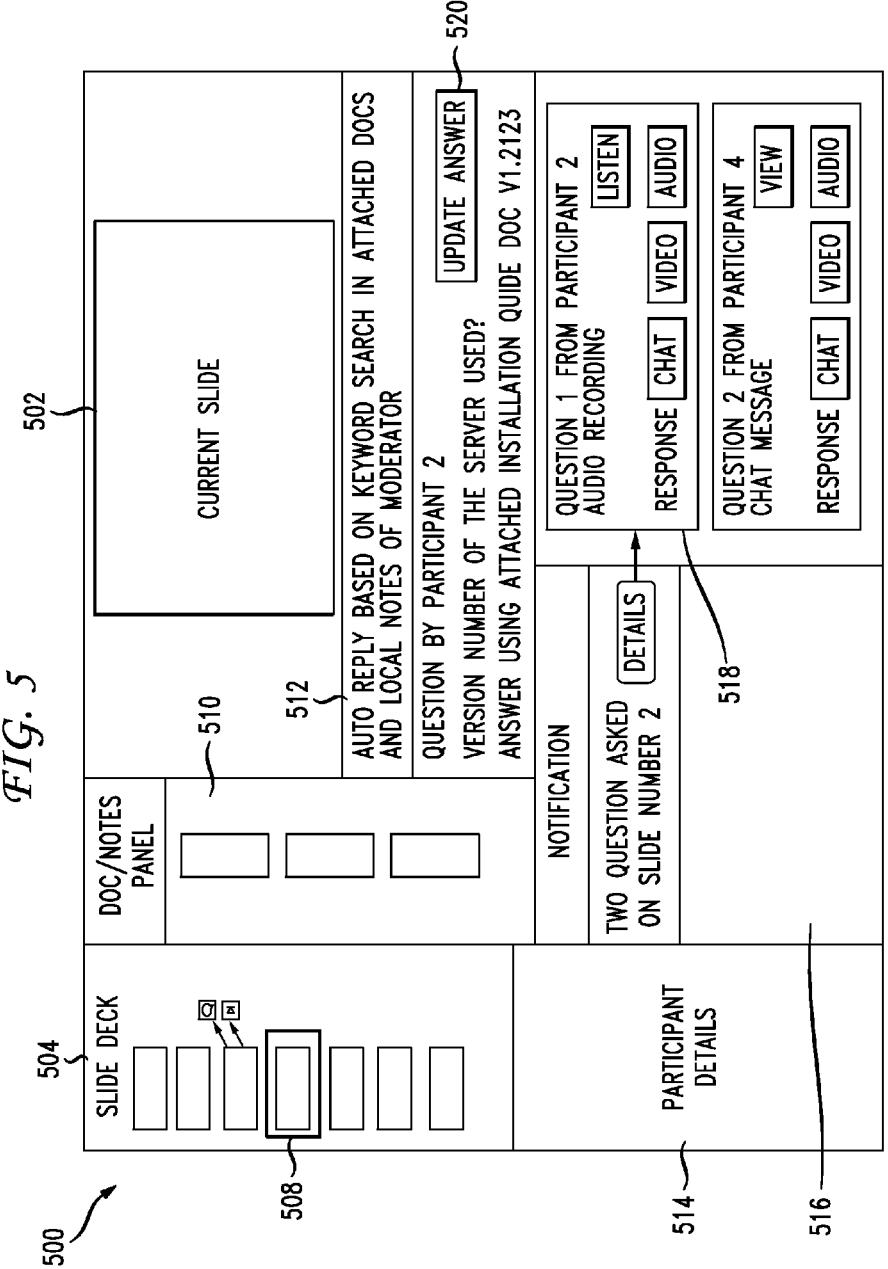
FIG. 5 illustrates an example moderator user interface.

FIG. 5 illustrates an example moderator user interface 500. The interface 500 can include a currently displayed slide 502 to the participants, as well as a slide deck 504 of available slides with an indication 508 of the currently displayed slide 502. The interface 500 can allow the presenter to view and update documents or notes 510 which the system can use to provide automatic answers 512 to questions. The presenter can also update previous answers 520 that the presenter created or that were automatically generated. For example, an answer may be phrased in such a way that it raises additional questions, so a clarification to the answer may be in order. Once the presenter answers a question, the system can notify the participant who can then navigate using the participant user interface 400 to the detailed view 418 for the answer. In one example, the presenter can drag items from the documents or notes 510 panel into the slide deck 504 to provide additional information that may answer specific questions, or which may further illustrate the answer provided. In another variation, the system or the presenter can recognize that a question will be answered in a subsequent slide or portion of the presentation. Thus, the system can notify the participant who asked the question to wait until a later portion of the presentation, and resubmit or revise the question if, at that time, the participant still has a question.

Figure 6:
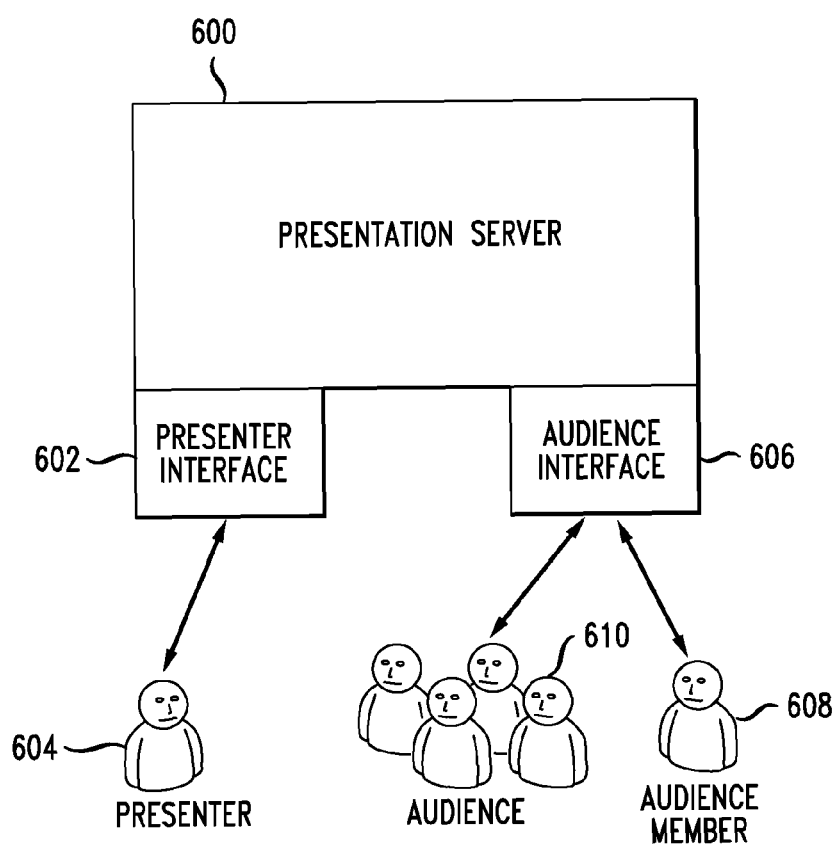
FIG. 6 illustrates an example architecture for a presentation server.

FIG. 6 illustrates an example architecture for a presentation server 600. The presentation server 600 interacts with a presenter 604 device via a presenter interface 602, which can be a web site, an application on a smart phone or other mobile device, or through an application programming interface (API), for example. The presentation server 600 also communicates with audience members 608, 610 through a corresponding audience interface 606. While the presentation server 600 is depicted as a single entity, the presentation server 600 can include separate servers that communicate with each other to transmit the presentation media and/or questions and answers relating to the presentation media. The presentation server 600 can operate independently of the actual presentation media channel itself. For example, the presentation can be an audio conference via telephone, and the presentation server 600 can operate via the Internet separately from the audio conference. When one audience member 608 submits a question to the presentation server 600, the presentation server 600 can transmit that question to the presenter 604 via the presenter interface 602, and optionally to one or more of the other audience members 610 via the audience interface 606. When the presenter 604 submits, via the presenter interface 602, an answer to the question 602, the presentation server 600 transmits that answer to at least one of the audience 610 or the audience member 608 who asked the question.

Figure 7:
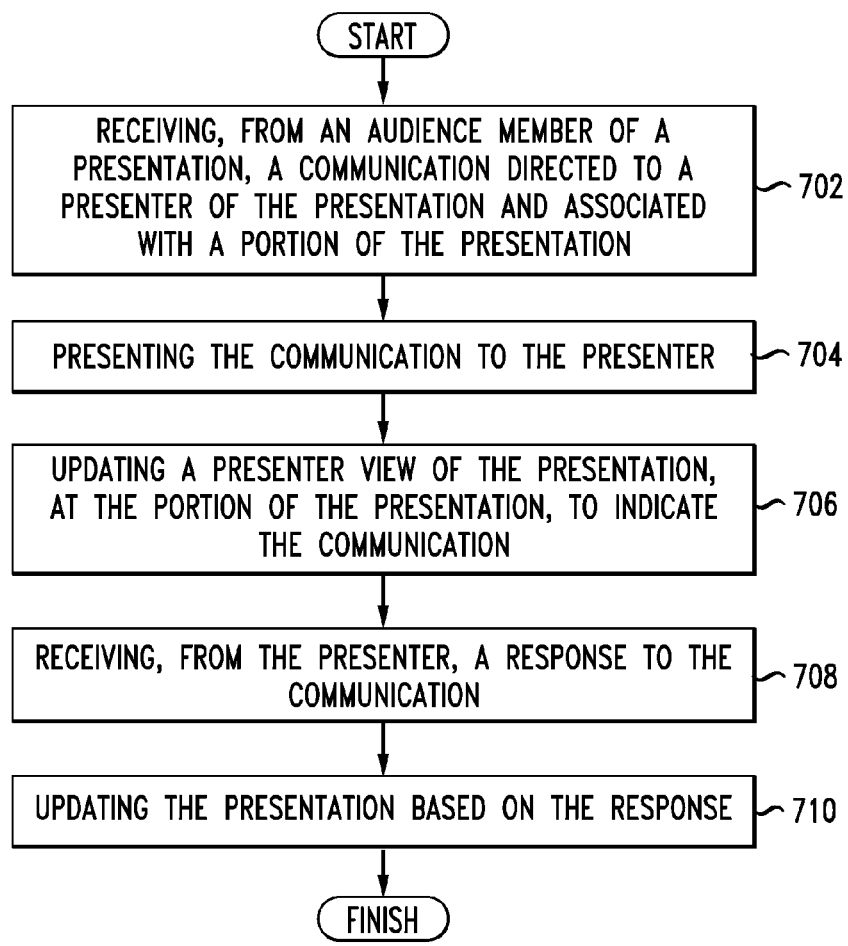
FIG. 7 illustrates an example method embodiment.
Figure 8:
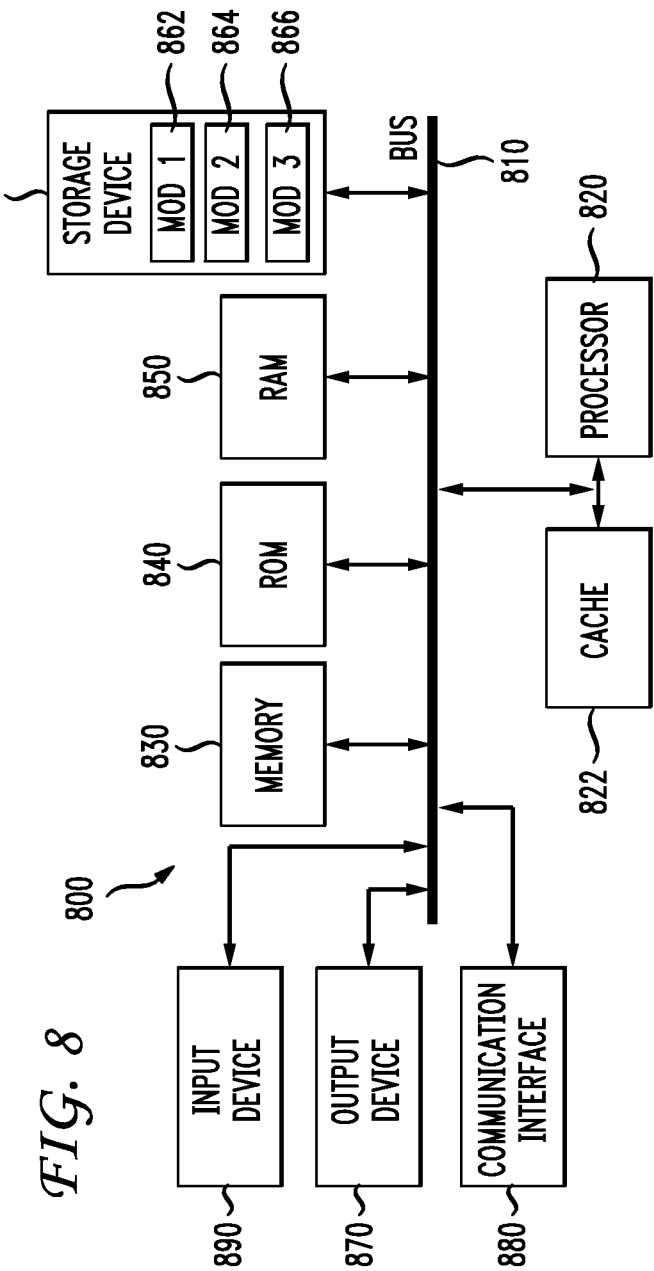
FIG. 8 illustrates an example system embodiment.

Having disclosed some basic system components and concepts, the disclosure now turns to the exemplary method embodiment shown in FIG. 7. For the sake of clarity, the method is discussed in terms of an exemplary system 800, as shown in FIG. 8, configured to practice the method. The steps outlined herein are exemplary and can be implemented in any combination or order thereof, including combinations that exclude, add, or modify certain steps. A system configured to practice the method can receive, from a viewer of an electronic presentation, a submission of a question and a selection of a communication mode for the question (702), and present the question to the presenter (704) such as by updating a presenter view of the presentation (706). The communication mode can be at least one of a text-based chat, audio, or video, or some other remote presence application. The system can identify a portion of the presentation to which the question is directed, and update the portion of the electronic presentation to incorporate the question based on the communication mode. The system can update the portion of the electronic presentation by incorporating the question into at least one of a viewer interface for the electronic presentation or a presenter interface for the electronic presentation. The system can optionally notify a presenter in the electronic presentation that the portion has been updated. The presenter can provide a response to the question (708), which the system can insert in the portion of the electronic presentation (710).

A brief description of a basic general purpose system or computing device in FIG. 8, which can be employed to practice the concepts, is disclosed herein. With reference to FIG. 8, an exemplary system 800 includes a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art and appropriate variations are contemplated depending on the type of device, such as whether the device 800 is a small, handheld computing device, a desktop computer, or a computer server.

Although the exemplary embodiment described herein employs the hard disk 860, it should be appreciated by those skilled in the art that other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod1 862, Mod2 864 and Mod3 866 which are modules configured to control the processor 820. These modules may be stored on the storage device 860 and loaded into RAM 850 or memory 830 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any graphical representation of open communication lines. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, from a viewer of an electronic presentation, a submission of a question and a selection of a communication mode for the question;
   identifying, via a processor, a portion of the presentation to which the question is directed;
   updating the portion of the electronic presentation to incorporate the question based on the communication mode;
   searching, based on a keyword, an automatic response to the question from a database of answers provided by the presenter; and
   inserting the automatic response in the portion of the electronic presentation.

2. The method of claim 1, wherein the portion of the electronic presentation comprises a slide.

3. The method of claim 1, further comprising:
   notifying a presenter in the electronic presentation that the portion has been updated.

4. The method of claim 1, wherein the communication mode comprises at least one of a text-based chat, audio, or video.

5. The method of claim 1, wherein updating the portion of the electronic presentation further comprises incorporating the question into at least one of a viewer interface for the electronic presentation or a presenter interface for the electronic presentation.

6. The method of claim 1, further comprising:
receiving, from a presenter, a response to the question;
inserting the response in the portion of the electronic presentation.

7. The method of claim 1, wherein the keyword is selected from the question.

8. A system comprising:
a processor; and
a computer-readable storage medium having instructions stored which, when executed by the processor, cause the processor to:
receive, from a viewer of an electronic presentation, a submission of a question and a selection of a communication mode for the question;
identify a portion of the presentation to which the question is directed;
update the portion of the electronic presentation to incorporate the question based on the communication mode;
searching, based on a keyword, an automatic response to the question from a database of answers provided by the presenter; and
inserting the automatic response in the portion of the electronic presentation.

9. The system of claim 8, wherein the portion of the electronic presentation comprises a slide.

10. The system of claim 8, further comprising:
notifying a presenter in the electronic presentation that the portion has been updated.

11. The system of claim 8, wherein the communication mode comprises at least one of a text-based chat, audio, or video.

12. The system of claim 8, wherein updating the portion of the electronic presentation further comprises incorporating the question into at least one of a viewer interface for the electronic presentation or a presenter interface for the electronic presentation.

13. The system of claim 8, further comprising:
receiving, from a presenter, a response to the question;
inserting the response in the portion of the electronic presentation.

14. The system of claim 8, wherein the keyword is selected from the question.

15. A computer-readable storage device storing instructions which, when executed by a processor, cause the processor to perform operations comprising:
receive, from a viewer of an electronic presentation, a submission of a question and a selection of a communication mode for the question;
identify a portion of the presentation to which the question is directed;
update the portion of the electronic presentation to incorporate the question based on the communication mode
searching, based on a keyword, an automatic response to the question from a database of answers provided by the presenter; and
inserting the automatic response in the portion of the electronic presentation.

16. The computer-readable storage device of claim 15, wherein the portion of the electronic presentation comprises a slide.

17. The computer-readable storage device of claim 15, storing additional instructions which, when executed by the processor, cause the processor to perform further operations comprising:
notifying a presenter in the electronic presentation that the portion has been updated.

18. The computer-readable storage device of claim 15, wherein the communication mode comprises at least one of a text-based chat, audio, or video.

19. The computer-readable storage device of claim 15, wherein updating the portion of the electronic presentation further comprises incorporating the question into at least one of a viewer interface for the electronic presentation or a presenter interface for the electronic presentation.

20. The computer-readable storage device of claim 15, storing additional instructions which, when executed by the processor, cause the processor to perform further operations comprising:
receiving, from a presenter, a response to the question;
inserting the response in the portion of the electronic presentation.

* * * * *